United States Patent [19]

Emori

[11] Patent Number: 4,974,079
[45] Date of Patent: Nov. 27, 1990

[54] BAND COMPRESSED VIDEO SIGNAL TRANSMISSION SYSTEM

[75] Inventor: Takahisa Emori, Tokyo, Japan
[73] Assignee: Attain Development Co., Ltd., Japan
[21] Appl. No.: 344,000
[22] Filed: Apr. 27, 1989

[30] Foreign Application Priority Data

May 2, 1988 [JP] Japan .................................. 63-107712

[51] Int. Cl.$^5$ ............................................... H04N 7/13
[52] U.S. Cl. ..................................... 358/138; 358/133
[58] Field of Search ............................ 358/138, 133

[56] References Cited

U.S. PATENT DOCUMENTS 4,819,086  4/1989  Hayashi .............................. 358/138

Primary Examiner—Howard W. Britton
Attorney, Agent, or Firm—Andrus, Sceales, Starke & Sawall

[57] ABSTRACT

A band compressed video signal transmission system is provided with a sampling circuit for sampling a video signal having a maximum frequency $f_m$ by a sampling signal which has a frequency $f_c$ which satisifies a formula $$f_c = (N/M) \times f_H$$

and is less than or equal to two times a maximum transmission frequency of an existing transmission path and is higher than the maximum frequency $f_m$ (where M and N are integers satisfying a relation of $N > M$, N/M is an irreducible fraction and $f_H$ is a horizontal scanning frequency), a DA converter for converting a sampled signal into an analog video signal, and a transmission path.

3 Claims, 6 Drawing Sheets

— ○ — FIRST FIELD
— ● — SECOND FIELD
— □ — THIRD FIELD
— ■ — FOURTH FIELD

LPF

HPF

BAND COMPRESSED VIDEO SIGNAL TRANSMISSION SYSTEM

DETAILED DESCRIPTION OF THE INVENTION

The present invention generally relates to band compressed video signal transmission systems in which a video signal is transmitted with its band compressed, and more particularly a band compressed video signal transmission system in which a video signal is converted into an analog video signal and transmitted after having been sampled at a predetermined frequency, the analog signal is again sampled at the receiver side and then a reproduced video signal is obtained through a DA converter.

In a band compressed video signal transmission system in which the video signal is band-compressed to a predetermined signal format and transmitted through a recording medium or other transmission path, a high resolution is of the largest concern. In this case, the importance lies in a band compressed video signal transmission system in which a resolution is increased with the compatibility with the existing video devices maintained.

As the conventional transmission system in which the picture quality is improved in mainly a television receiver without changing the existing television system standard, a system is known, in which intra-field processing, inter-field processing or inter-frame processing is carried out by use of a digital memory to increase the apparent resolution in a non-interlace system television receiver.

In a magnetic recording and reproducing device (VTR), a system is known in which the picture quality is improved by a noise reduction circuit which utilizes a field correlation of the video signal with use of a digital field memory. Further, a high resolution VTR has become widely used, in which a frequency-modulated luminance signal of wider band than that of the existing home-use VTR and with a higher carrier frequency is recorded and reproduced, as a result of advancement in magnetic tape technology, head processing technology and circuitry technology. According to such high resolution VTR, the transmission band is around 5 MHz and the reproduced picture has a higher resolution than that in those home-use VTRs in which the transmission band is around 3 MHz.

However, in each of the above-mentioned digital television set, non-interlace system television set and VTR having a noise reduction circuit, the high resolution level is still insufficient. Particularly, the VTR having the noise reduction circuit did not substantially improve the picture quality, and only the noise is reduced visually. In addition, those which utilize a frame correlation by using a frame memory were not able to avoid a deterioration of the picture quality in fast moving pictures or pictures having no frame correlation.

On the one hand, as the system in which the picture quality of the video signal of the existing system is improved substantially, there are known the high resolution VTR described above, as well as the high definition (HD) television system high vision proposed by the Japan Broadcasting Association.

However, the high resolution VTR has no compatibility with the existing home-use VTR in wide use and cannot use the existing magnetic tapes. The above HD television system is a new broadcasting system completely different from the existing NTSC system, and no television receivers presently used widely in general households can receive the transmission and no compatibility is achieved.

Accordingly, it is a general object of the present invention to provide a movel and useful band compressed video signal transmission system in which the above described problems are eliminated.

Another and more specific object of the present invention is to provide a band compressed video signal transmission system in which a video signal having a maximum frequency $f_m$ is sampled in a transmitting side at a predetermined frequency $f_c$ which is less than or equal to two times a maximum transmission frequency of an existing transmission path and higher than the maximum frequency $f_m$ of the video signal, a sampled signal thus obtained is converted into an analog video signal and transmitted to the above transmission path, the above analog video signal is re-sampled in a receiving side at the sampling cycle $f_c$ to generate a re-sampled signal, and a reproduced video signal is obtained by passing a synthesized signal which is generated based on the re-sampled signal through a DA converter with a clock frequency $2f_c$.

According to the system of the present invention, it is possible to transmit a video signal having a band wider than the transmission band of the existing transmission path through the existing transmission line, and the video signal can be compatibly reproduced even in the existing receiving system without deteriorating the picture quality.

Still another object of the present invention is to provide a band conpressed video signal transmission system in which an input analog video signal is re-sampled in the receiving side at the sampling frequency $f_c$ to generate a re-sampled signal, a first synthesized signal comprised of a high-frequency component of a delayed re-sampled signal which is obtained by delaying the re-sampled signal a predetermined horizontal scanning period in a delay circuit and a low-frequency component of the input re-sampled signal to the delay circuit is generated, a second synthesized signal in which the first synthesized signal and the input re-sampled signal of the delay circuit are synthesized alternately in time sequence for every time of $1/(2f_c)$ is generated, and a reproduced video signal is obtained by DA-converting this second synthesized signal.

According to the system of the present invention, it is possible to obtain a reproduced picture having a high quality with a sufficiently higher horizontal resolution than the conventional system and without deterioration in the vertical resolution, even when the video signal has a wider band then the existing transmission path and relates to moving pictures or pictures having no frame correlation, as long as there is an intra-field correlation or line correlation.

Other objects and further features of the present invention will be apparent from the following detailed description when read in conjunction with the accompanying drawings.

Because the video signal has the line correlation, and by utilizing this characteristic, even in case where the sampling frequency $f_c$ is lower than a frequency two times the maximum frequency $f_m$ of the video signal, the aliasing component generated in this case is mutually cancelled by the interpolation of the sampling of two or more lines.

In other words, since the NTCS system color video signal is, as well known, a signal in which a carrier chrominance signal is band-share-multiplexed to a high-frequency region of a luminance signal, the luminance signal can be separated from the carrier chrominance signal by utilizing the line correlation using a comb filter comprised of 1H delay circuit (where H is a horizontal scanning period) and a circuit to add and subtract the input and output of the 1H delay circuit, without damaging the luminance signal component in the high-frequency region in which the carrier chrominance signal is band-share-multiplexed. Therefore, it is possible to achieve higher luminance signal resolution than a method in which a luminance signal not including the luminance signal component of the high-frequency region is separated and filtered from the NTSC system color video signal by use of lowpass filter.

This means that the resolution is increased only when the interpolation is made for two or more lines (horizontal scanning lines), and thus, the video information in one line is sufficient at one-half. Thus, by interpolation of the re-sampled signal at two or more lines in the receiving side, a wide band video signal can be transmitted with its band compressed.

However, under this condition, it only signifies that a transmission of the sampled signal of the sampling frequency $f_c$ with its band compressed is possible, but the picture quality is deteriorated. Therefore, according to the present invention, the re-sampled signal (digital signal) which is subject to the interpolation in the receiving side is limited only to high-frequency component, and as a low-frequency component of the re-sampled signal the one in the existing line is used as it is. Hence, the horizontal resolution is improved without deteriorating the vertical resolution which is the low-frequency component, and the aliasing component is nearly mutually cancelled by the line correlation, becoming inconspicuous on the screen.

According to the present invention, the sampling frequency $f_c$ is selected in light of the above points, and at less than or equal to two times the maximum transmission frequency in the existing transmission path in view of the compatibility with the existing system. Thus, the wide band video signal can be transmitted with its band compressed even in the existing transmission path.

Figure 1:
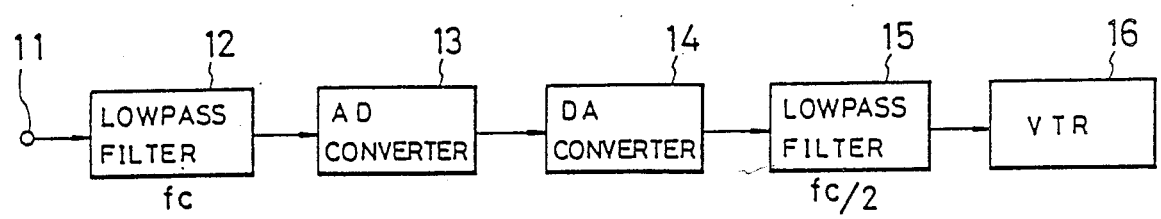
FIG. 1 is a system block diagram showing one embodiment of a transmission system according to the present invention.

Descriptions are given hereunder of the embodiments of the present invention. FIG. 1 shows an embodiment of the present invention applied to a VTR, in which a wide band video signal supplied to an input terminal 11 is supplied to a lowpass filter 12 wherein a frequency component of the sampling frequency $f_c$ and over is eliminated and thereafter supplied to an AD converter 13.

The AD converter 13 samples the input video signal by a sampling signal having the sampling frequency $f_c$ which satisfies the following formula and generates a sampled signal.

$$f_c = (N/M) \times f_H \qquad (1)$$

In the above formula (1), N and M are positive integers, N/M is an irreducible fraction and $f_H$ is a horizontal scanning frequency of the video signal. Between the sampling frequency $f_c$ and a maximum frequency $f_m$ of the video signal, there is a relation represented by:

$$f_c > f_m \qquad (2)$$

Further, the sampling frequency $f_c$ is a frequency less than or equal to two times the maximum transmission frequency of an existing transmission path. This is for the purpose of enabling transmission of the sampled signal in the existing transmission path.

Here, the sampling frequency $f_c$ is selected to 5.011363 MHz (hereinafter simply referred to as 5 MHz for the sake of convenience) which corresponds to the case where N=637 and M=2 in the formula (1).

The sampling frequency of 5 MHz satisfies the condition of the relation (2) that it is higher than the maximum frequency ($=f_m$) of 4, 2 MHz of the existing NTSC system video signal and the condition that it is lower than two times the maximum frequency of above 3 MHz of the recording and reproducing band of an existing VTR 16 which is described later.

Figure 2:
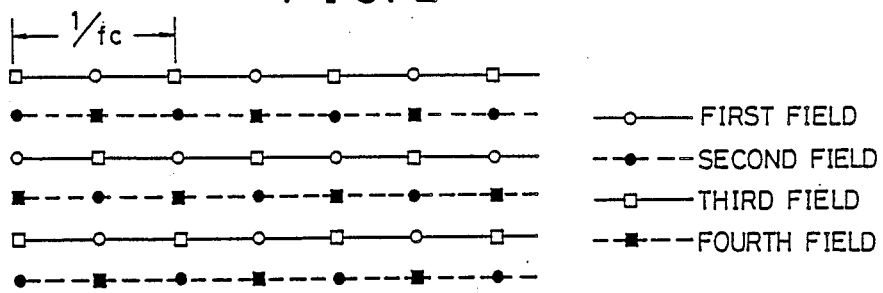
FIG. 2 is a diagram showing an example of sampling points on a screen according to the present invention.

The sampling points of the video signal sampled at the sampling frequency of 5 MHz can be schematically illustrated on a screen as shown in FIG. 2. As may be seen from FIG. 2, the sampling points are located at positions represented by white circles in the first field, by black circles in the second field, by white squares in the third field and by black squares in the fourth field. The sampling points differ in each field, and make one round in four fields (two frames).

Figure 5A:
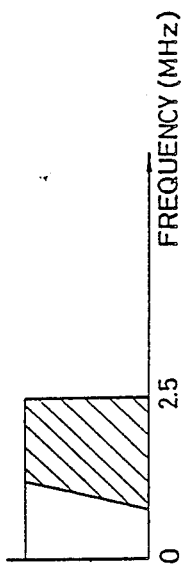
FIGS. 5A and 5B show examples of the frequency spectra of input and output video signals in the block system shown in FIG. 4.
Figure 5B:
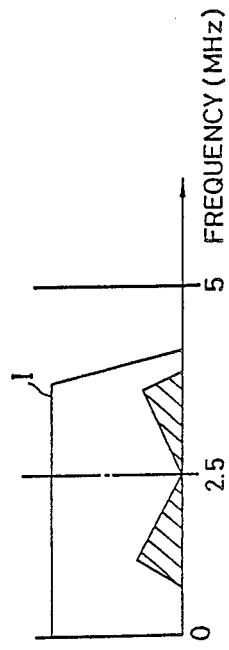

Now, a description is given by returning to FIG. 1. The sampled signal obtained from the AD converter 13 is supplied to the DA converter 14 where it is returned to an analog video signal by a digital-analog conversion based on the clock frequency of 5 MHz. Next, the video signal component having a frequency spectrum of less than or equal to ½ the sampling frequency as shown in FIG. 5(A) is filtered by a lowpass filter 15 with a cut-off frequency of $f_c/2$ (that is, 2.5 MHz), and supplied to a recording system of the VTR 16. Hatched portions in FIGS. 5(A) and 5(B) show the aliasing component.

Figure 3:
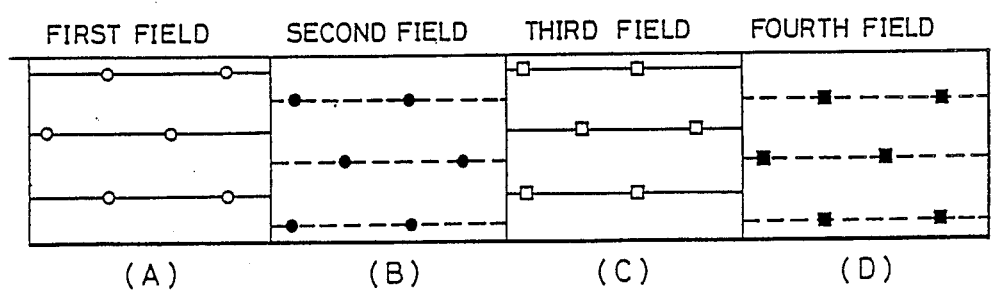
FIG. 3 is a diagram for explaining the sampling points in each field of the recorded video signals in the block system shown in FIG. 1.

The VTR 16 is the existing home-use VTR widely used presently, and records the video signal from the lowpass filter 15 on a magnetic tape by a known means as has been done conventionally. The video signal recorded on the magnetic tape is a video signal at the sampling points schematically shown on the screen in FIG. 3(A) for the first field, the sampling points shown in FIG. 3(B) for the second field, the sampling points shown in FIG. 3(C) for the third field and the sampling points shown in FIG. 3(D) for the fourth field Since the band of the video signal is 2.5 MHz, it can be recorded on the VTR 16 without a problem.

When a recorded magnetic tape recorded with the above video signal is reproduced on the existing VTR 16, the images of the sampling points with the period of four fields as schematically shown in FIGS. 3(A), 3(B), 3(C) and 3(D) are reproduced and displayed so that one round is made in the order of the first field, second field, third field and fourth field. Therefore, according to this embodiment, it is possible for the existing VTR 16 to carry out recording and reproduction, of the video signal and the reproduced video signal from the VTR 16 can be displayed on the existing television receiver with a picture quality which is satisfactory from the practical point of view (that is, the compatibility is ensured).

Figure 6:
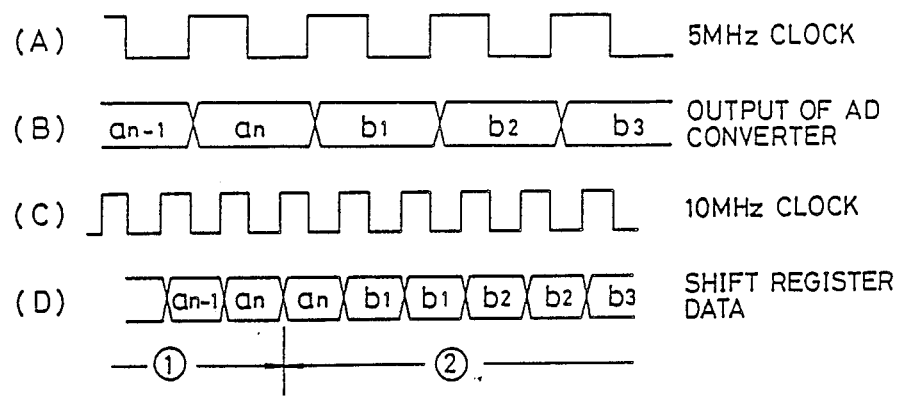
FIG. 6 is a time chart for explaining the operation of an essental part of the block system shown in FIG. 4.

Next, a description is given of one embodiment of the receiving system (reproducing system) according to the present invention. As described above, the video signal reproduced on the existing VTR 16 has a frequency spectrum shown in FIG. 5(A) and its unwanted high-frequency component is eliminated by the lowpass filter 7 shown in FIG. 4 having the cut-off frequency of $f_c/2$ (2.5 MHz in this case). The reproduced video signal is then supplied to an AD converter 18 where it is sampled at a sampling frequency of 5 MHz into a re-sampled signal This re-sampled signal is a digital signal comprised of picture element data, and is supplied to a 1H delay circuit 19 made up of a line memory. The line memory making up the 1H delay circuit 19 is constituted by K stages of shift registers, for example. The K stages of shift registers output a re-sampled signal which is delayed by a delay time of 1H by performing K shifts based on a clock having the clock frequency of $2f_c$ (10 MHz in this case). Here, if an input 5 MHz clock of the AD converter 18 is as shown in FIG. 6(A), the signal of a last picture element $a_N$ in the first line of a certain field and the signal of a first picture element $b_1$ in the second line of the same certain field are output as the output signal of the AD converter 18 as shown in FIG. 6(B). The shift register of the first stage within the 1H delay circuit 19 outputs the output data shown in FIG. 6(D) based on a clock of 10 MHz shown in FIG. 6(C). ① and ② in FIG. 6 indicate the first line and the second line, respectively.

Figure 7A:
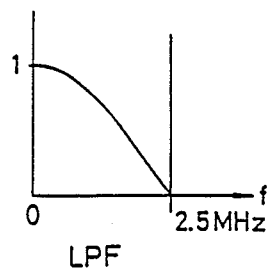
FIGS. 7A and 7B show examples of the filter characteristics in the block system shown in FIG. 4.
Figure 7B:
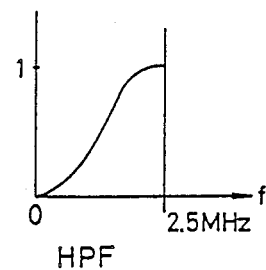

The delayed re-sampled signal obtained from the 1H delay circuit 19 is supplied to a digital highpass filter 20 wherein it is given a highpass filtering characteristics shown in FIG. 7(B) and a high-frequency component is extracted.

In addition, the output re-sampled signal of the AD converter 18 is supplied to a digital lowpass filter 21 wherein it is given a lowpass filter characteristic shown in FIG. 7(A) and a low frequency component is extracted. The high-frequency component and the low-frequency component are supplied to an adder circuit 22 wherein they are added and formend into a first synthesized signal. The first synthesized signal is applied to a terminal 23a of a switching circuit 23.

The switching circuit 23 makes a switching to alternately output the first synthesized signal which is supplied to the terminal 23a and the output re-sampled signal of the AD converter 18 which is supplied to a terminal 23b for every time of $1/(2f_c)$, that is, every 100 ns, and the output signal is supplied to a DA converter 24. In other words, the signal supplied to the DA converter 24 is a second synthesized signal in which the first synthesized signal and the re-sampled signal are alternately synthesized in time sequence for every 100 ns, and the apparent sampling frequency is $2f_c$ (that is, 10 MHz).

Figure 8A:
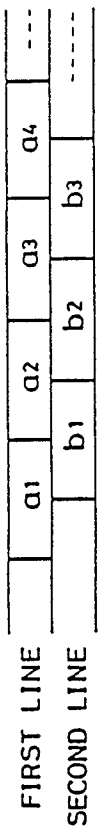
FIGS. 8A and 8B are diagrams for explaining the displaying picture elements (sampling points) in the receiving system according to the present invention.

If the output re-sampled signal of the AD converter 18 is DA-converted as it is and displayed on the screen, each picture element (sampling point) in the first line and the second line of the same field is shifted by $1/(2f_c)$ and displayed for every $1/f_c$ as shown schematically in FIG. 8(A), as shown before in FIG. 2.

Figure 8B:
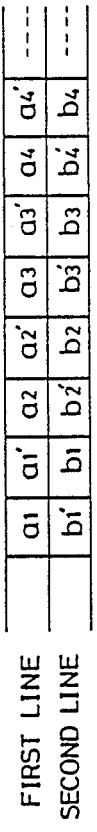

On the other hand, if the second synthesized signal is DA-converted as it is and displayed on the screen, each picture element in the first line and the second line is displayed for every $1/(2f_c)$ as shown schematically in FIG. 8(B). In FIG. 8(B), the picture element added with a dash is a picture element of the first synthesized signal. For example, the picture element $b_i'$ in the second line is represented by:

$$b_i' = \tfrac{1}{2}(b_{i-1} + b_i) + \tfrac{1}{2}a_i - \tfrac{1}{4}(a_{i-1} + a_{i+1})$$

In the above formula, $(\tfrac{1}{2}) \cdot (b_{i-1} + b_i)$ is the low-frequency component, and $(\tfrac{1}{2}) a_i - (\tfrac{1}{4})(a_{i-1} + a_{i+1})$ is the high-frequency component.

This second synthesized signal is a signal in which the aliasing component of the re-sampled signal of the present line is nearly mutually cancelled by the line correlation with the high-frequency component of the line 1H before, and includes the low-frequency component of the present line as it is. However, this low-frequency component originally includes only a little of the aliasing component.

Accordingly, because the second synthesized signal is subjected to the digital-analog-conversion in the DA converter 24 which operates at the clock frequency of $2f_c$ (that is, 10 MHz) and then filtered of only the signal component less than or equal to the frequency $f_c$ (that is, 5 MHz) by a lowpass filter 25, a reproduced video signal output to an output terminal 26 becomes a wide band reproduced video signal having a frequency spectrum indicated by I in FIG. 5(B).

The hatched portion in FIG. 5(B) shows the aliasing component the amount of which is does not introduce a problem in normal pictures. According to this embodiment, since a reproduced video signal with a wider band can be obtained than in the existing VTR having a transmission band of about 3 MHz, the horizontal resolution is improved, and the vertical resolution is not deteriorated because the low-frequency component is used as it is. Moreover, because the intra-field correlation or the line correlation is used rather than the frame correlation, a sufficiently high resolution can be obtained even with respect to moving pictures or video signals having no frame correlation.

Figure 4:
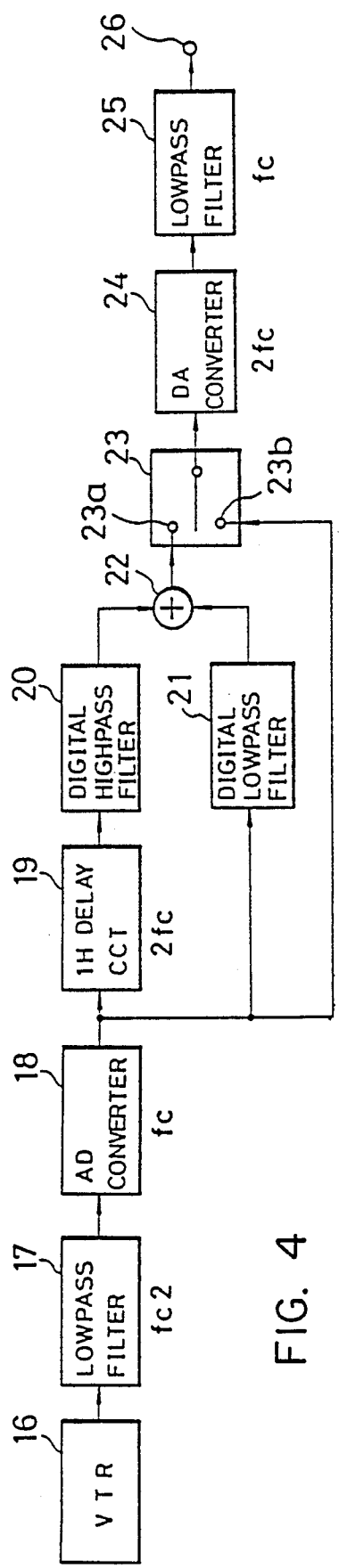
FIG. 4 is a system block diagram showing one embodiment of a receiving system according to the present invention.
Figure 9:
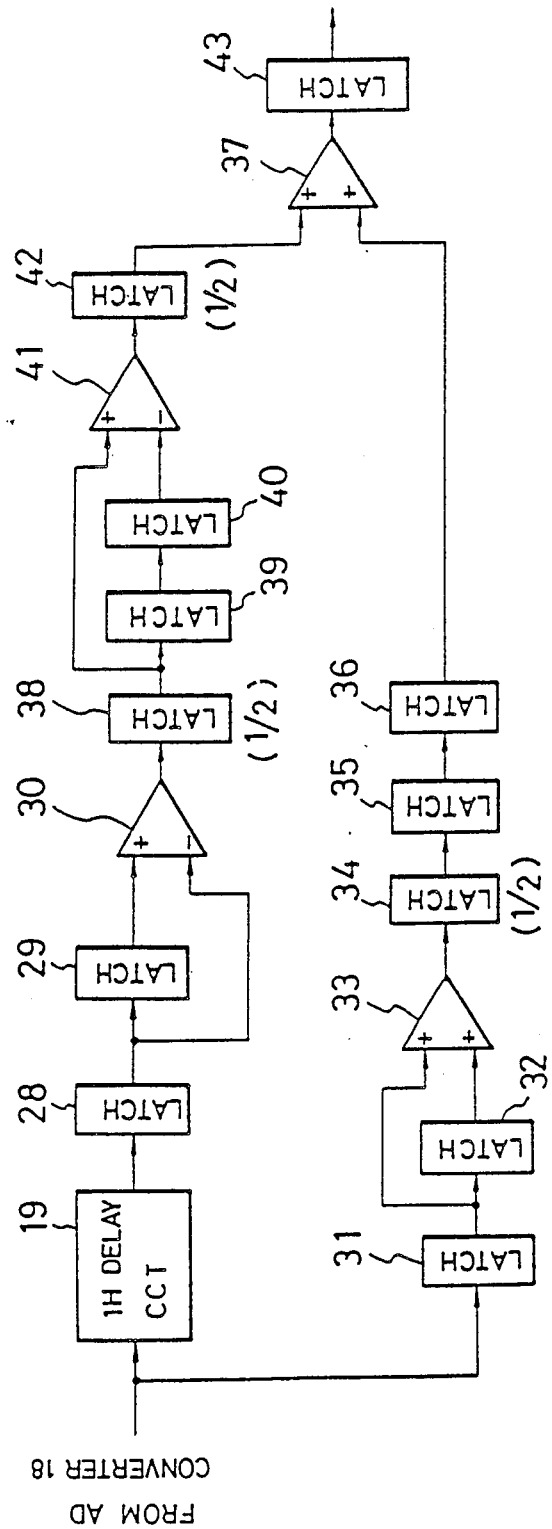
FIG. 9 is a system block diagram showing another embodiment of an essential part of the receiving system according to the present invention.

Next descriptions are given of another embodiment of an essential part of the present invention, by referring to FIGS. 9 through 11. In FIG. 9, those parts which are the same as those corresponding parts in FIG. 4 are designated by the same reference numerals and a description thereof will be omitted. In FIG. 9, 28, 29, 31, 32, 34, 35, 36, 38, 39, 40, 42 and 43 all denote latch circuits, and each latch in unit makes a latch operation responsive to a latch pulse having the frequency $2f_c$. The re-sampled signal which is obtained from the AD converter 18 has a frequency spectrum shown in FIG. 10(A) and includes a video information which changes as shown in FIG. 11(A). This re-sampled signal is delayed by 1H by the 1H delay circuit 19 and then supplied to a subtrating circuit 30 through the latch circuits 28 and 29. The subtracting circuit 30 subtracts the re-sampled signal from the latch circuit 28 of the time $1/(2f_c)$ before hatched portion in FIG. 10 indicates the aliasing component.

On the other hand, the input re-sampled signal is supplied to an adder circuit 33 through the latch circuits 31 and 32 and added to the re-sampled signal from the latch circuit 28 of the time $1/(2f_c)$ before. An output signal of the adder circuit 33 is supplied to the latch circuit 34 wherein it is shifted by one bit toward the direction of the lower significant bits so that the information content is multiplied by ½ and stored temporarily, and is then supplied to an adder 37 through the latch circuits 35 and 36.

On the other hand, the signal obtained from the subtracting circuit 30 is shifted by one bit toward the direction of the lower significant bits by the latch circuit 38 and stored temporarily, and is then supplied to a subrating circuit 41 and on one hand and to the subtracting circuit 41 through the latch circuits 39 and 40 respectively. An output signal of this subtracting circuit 41 is supplied to the latch circuit 42 wherein it is shifted by one bit toward the direction of the lower significant bit and data multiplied by ½ is stored temporarily. An output of the shift register 42 is added to the output signal of in the latch circuit 36 as the high-frequency component the adder circuit 37. An output signal of this adder circuit 37 is latched in the latch circuit 43 and then supplied to the DA converter 24.

The changes for every 100 ns of the data contents of the major latch circuits 28, 31, 36, 38 and 42 in the above structure are shown collectively in the following table. In the table $a_1$ through $a_n$ denote each of the picture elements in the first line of the output re-sampled signal of the AD converter 18, and $b_1$ through $b_n$ denote each of the picture elements in the second line.

| Latch circuit 31 | Latch circuit 36 | Latch circuit 28 | Latch circuit 38 | Latch circuit 42 |
|---|---|---|---|---|
| . | . | . | . | . |
| . | . | . | . | . |
| . | . | . | . | . |
| $a_n$ | . | $a_1$ | . | . |
| . | . | . | . | . |
| $b_1$ | . | $a_1$ | . | . |
| . | . | . | . | . |
| $b_1$ | . | $a_2$ | 0 | . |
| . | . | . | . | . |
| $b_2$ | $a_n$ | $a_2$ | $(a_1-a_2)/2$ | . |
| $b_2$ | $(a_n+b_1)/2$ | $a_3$ | 0 | . |
| . | . | . | . | . |
| . | . | . | . | . |
| $b_3$ | $b_1$ | $a_3$ | $(a_2-a_3)/2$ | 0 |
| $b_3$ | $(b_1+b_2)/2$ | $a_4$ | 0 | $(a_2/2) - (a_1+a_3)/4$ |
| $b_4$ | $b_2$ | $a_4$ | $(a_3-a_4)/2$ | 0 |
| $b_4$ | $(b_2+b_2)/2$ | $a_5$ | 0 | $(a_3/2) - (a_2+a_4)/4$ |
| $b_5$ | $b_3$ | $a_5$ | $(a_4-a_5)/2$ | 0 |
| . | . | . | . | . |
| . | . | . | . | . |

Figure 10A:
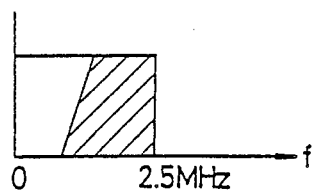
FIGS. 10A-10E show frequency spectra of signals at each part of the block system shown in FIG. 9.
Figure 10B:
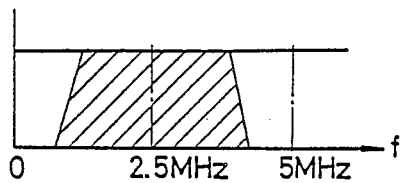
Figure 10C:
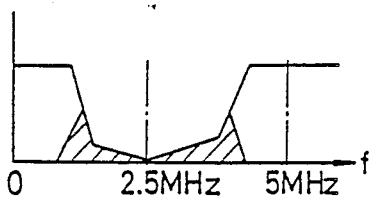
Figure 11A:
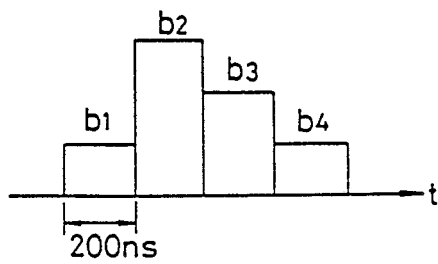
FIGS. 11A-11E are diagrams for explaining the change in the signals at each part of the block system shown in FIG. 9.
Figure 11B:
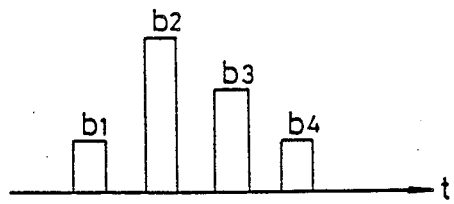
Figure 11C:
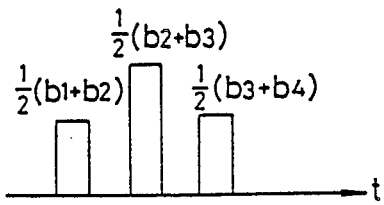

As may be seen from the above table, the signal supplied from the latch circuit 36 to the adder circuit 37 is a signal in which the first signal having the frequency spectrum shown in FIG. 10(B) and the video signal information which changes as shown in FIG. 11(B) and the second signal having the frequency spectrum shown in FIG. 10(C) and the video signal information which changes as shown in FIG. 11(C) are alternately synthesized in time sequence for every 100 ns.

Figure 10D:
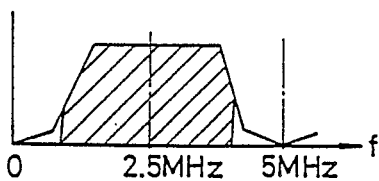
Figure 11D:
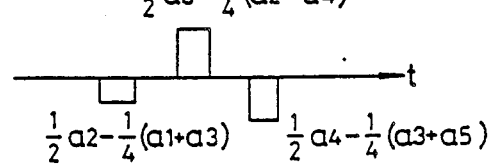

The signal supplied from the latch circuit 42 to the adder circuit 37 is the high-frequency component which is delayed by 1H and has the frequency spectrum shown in FIG. 10(D) and the video information which changes as shown in FIG. 11(D). This signal is output for every 100 ns.

Figure 10E:
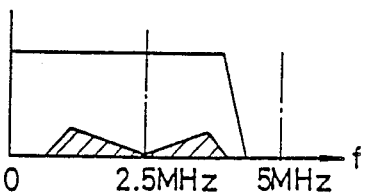
Figure 11E:
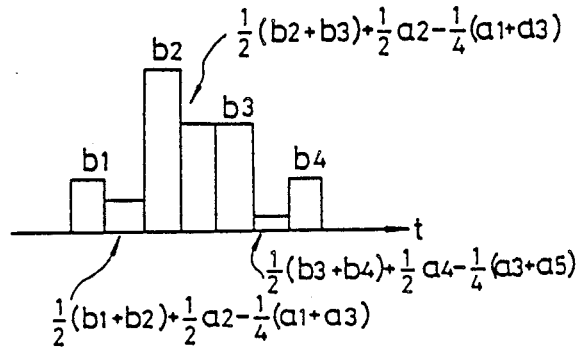

Therefore, the output signal of the latch circuit 43 which latches the output signal of the adder circuit 37 becomes the second synthesized signal which has the frequency spectrum shown in FIG. 10(E) and has the video information which changes as shown in FIG. 11(E). In other words, the output signal of this latch circuit 43 becomes identical to the output signal of the switching circuit 23 shown in FIG. 4, and is displayed as shown in FIG. 8(B). In this embodiment, it is also possible to similarly obtain a reproduced video signal having a high resolution as in the case of FIG. 4.

The present invention is not limited to the above embodiments, but the interpolation can be made for three lines, four lines and the like. In addition, the sampling frequency is not limited to 5 MHz, and the video signal can be applied to a high vision signal. Furthermore, the system can be generally applied widely to apparatuses in which the video signal is recorded and reproduced on and from other recording media such as a disk or the like, and even to transmission systems in which video signal is transmitted by wire or wireless.

I claim:

1. A band compressed video signal transmission system characterized in that there are provided:

sampling means (13) for sampling a video signal having a maximum frequency $f_m$ by a sampling signal which has a frequency $f_c$ which satisfies a formula $$f_c = (N/M) \times f_H$$

and is less than or equal to two times a maximum transmission frequency of an existing transmission path and is higher than the maximum frequency $f_m$ (where M and N are the integers satisfying a relation N > M, N/M is an irreducible fraction and $f_H$ is a horizontally scanning frequency);

A DA converter (14) for converting into an analog video signal a re-sampled signal which is obtained by sampling the video signal by said sampling means; and a transmission path (16) for transmitting analog video signal obtained from said DA converter (14).

2. The band compressed video signal transmission system as claimed in the claim 1 which is further provided with:

re-sampling means (18) for re-sampling the analog video signal which is obtained through said transmission path (16) at the sampling frequency $f_c$;

a delay circuit (19) for delaying a re-sampled signal which is obtained from said re-sampling means (18) by a predetermined horizontal scanning period;

a first filter circuit (20) for filtering a high-frequency component of a delayed re-sampled signal which is obtained from said delay circuit (19);

a second filter circuit (21) for filtering a low-frequency component of the re-sampled signal which is obtained from said re-sampling means (18);

a first synthesizing means (22) for generating a first synthesized signal by synthesizing output signals of said first and second filter circuits;

a second synthesizing means (23) for generating a second synthesized signal by alternately time-division-multiplexing the re-sampled signal obtained from said re-sampling means (18) and said first synthesized signal for every time of $1/(2f_c)$; and a DA converter (24) for converting said second synthesized signal into an analog reproduced video signal at a clock frequency $2f_c$.

3. The band compressed video signal transmission system as claimed in the claim 1 which is further provided with:

re-sampling means (18) for re-sampling the analog video signal which is obtained through said transmission path (16) at the sampling frequency $f_c$;

a delay circuit (19) for delaying a re-sampled signal which is obtained from said re-sampling means (18) by a predetermined horizontal scanning period;

first subtrating means (28-30) for carrying out a subtraction between signals which have a mutual time difference of $1/(2f_c)$ out of a delayed re-sampled signal which is obtained from said delay circuit (19);

first shift means (38) for shifting an output signal of said first subtrating means by one bit toward a direction of lower significant bits;

delay means (39, 40) for delaying an output signal of said first shift means by a predetermined delay time;

second subtracting means (41) for subtracting an output signal of said delay means from the output signal of said first shift means;

second shift means (42) for shifting an output signal of said second subtracting means by one bit toward a direction of lower significant bits and for outputting a high-frequency component of the delayed re-sampled signal;

first adder means (31-33) for carrying out an addition between signals having a mutual time difference of $1/(2f_c)$ out of the re-sampled signal which is obtained from said re-sampling means;

signal generating means (34-36) for generating a third synthesized signal by shifting an output signal of said first adder means by one bit toward a direction of lower significant bits and delaying the signal by a predetermined delay time, said third synthesized signal including a low-frequency component of the re-sampled signal which is matched in time to the high-frequency component of the delayed re-sampled signal and the resampled signal are alternately time-division multiplexed for every time of $1/(2f_c)$;

second adder means (37) for generating a fourth synthesized signal by adding an output signal of said second shift means and said third synthesized signal obtained from said signal generating means; and a DA converter (24) for converting said fourth synthesized signal into an analog reproduced video signal at a clock frequency $2f_c$.

* * * * *